(12) United States Patent
Fischer et al.

(10) Patent No.: US 8,544,883 B2
(45) Date of Patent: Oct. 1, 2013

(54) TEAR STITCHING FOR INFLATABLE VEHICLE OCCUPANT PROTECTION DEVICES

(75) Inventors: Kurt F. Fischer, Leonard, MI (US); Douglas M. Gould, Lake Orion, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 89 days.

(21) Appl. No.: 13/032,691

(22) Filed: Feb. 23, 2011

(65) Prior Publication Data

US 2011/0140401 A1 Jun. 16, 2011

Related U.S. Application Data

(63) Continuation-in-part of application No. 12/703,325, filed on Feb. 10, 2010, now abandoned, which is a continuation-in-part of application No. 12/077,826, filed on Mar. 21, 2008, which is a continuation-in-part of application No. 11/881,918, filed on Jul. 30, 2007, now Pat. No. 7,954,850, application No. 13/032,691, which is a continuation-in-part of application No. 12/884,619, filed on Sep. 17, 2010.

(60) Provisional application No. 60/936,710, filed on Jun. 21, 2007.

(51) Int. Cl.
*B60R 21/2338* (2011.01)
*B60R 21/2346* (2011.01)

(52) U.S. Cl.
USPC .................................................. 280/743.2

(58) Field of Classification Search
USPC ................... 280/730.1, 730.2, 739, 740, 742, 280/743.1, 743.2, 728.1, 731, 732, 736, 738, 280/801.1, 808, 802, 805; 28/112
See application file for complete search history.

(56) References Cited

U.S. PATENT DOCUMENTS

| | | |
|---|---|---|
| 3,527,475 A | 9/1970 | Carey et al. |
| 3,573,885 A | 4/1971 | Brown et al. |
| 3,642,303 A | 2/1972 | Irish et al. |
| 3,879,057 A | 4/1975 | Kawashima et al. |
| 3,944,249 A | 3/1976 | Smith et al. |
| 4,097,065 A | 6/1978 | Okada et al. |
| 4,262,931 A | 4/1981 | Strasser et al. |

(Continued)

FOREIGN PATENT DOCUMENTS

| | | |
|---|---|---|
| DE | 19640322 | 3/1998 |
| DE | 202006002496 | 8/2006 |

(Continued)

*Primary Examiner* — Karen Beck
(74) *Attorney, Agent, or Firm* — Tarolli, Sundheim, Covell & Tummino LLP

(57) ABSTRACT

Tear stitching (100) for interconnecting portions (130, 140) of an inflatable vehicle occupant protection device (14) includes first and second end portions (102, 104) having curled configurations and a central portion (110) extending between the end portions. The central portion (110) includes leg portions (112, 114) that converge at an angle and intersect a break point (116). The tear stitching (100) exhibits a comparatively high rupture strength in response to tension forces applied to the interconnected portions (130, 140) that act on the end portions (102, 104) of the tear stitching (100). The tear stitching (100) exhibits a comparatively low rupture strength in response to tension forces applied to the interconnected portions (130, 140) that act on the break point (116) of the tear stitching (100).

21 Claims, 8 Drawing Sheets

(56) References Cited

U.S. PATENT DOCUMENTS

| | | | |
|---|---|---|---|
| 4,360,223 | A | 11/1982 | Kirchoff |
| 4,500,114 | A | 2/1985 | Grey, Jr. |
| 4,805,930 | A | 2/1989 | Takada |
| 4,907,616 | A | 3/1990 | Bergsma |
| 5,007,662 | A | 4/1991 | Abramczyk et al. |
| 5,016,913 | A | 5/1991 | Nakajima et al. |
| 5,020,567 | A | 6/1991 | Proulx |
| 5,044,663 | A | 9/1991 | Seizert |
| 5,217,249 | A | 6/1993 | Kokeguchi |
| 5,246,250 | A | 9/1993 | Wolanin et al. |
| 5,308,113 | A | 5/1994 | Moriset |
| 5,405,166 | A | 4/1995 | Rogerson |
| 5,489,119 | A | 2/1996 | Prescaro et al. |
| 5,560,649 | A | 10/1996 | Saderholm et al. |
| 5,613,708 | A | 3/1997 | Bleider et al. |
| 5,678,858 | A | 10/1997 | Nakayama et al. |
| 5,695,214 | A | 12/1997 | Faigle et al. |
| 5,813,696 | A | 9/1998 | Hill |
| 5,853,191 | A | 12/1998 | Lachat |
| 5,853,192 | A | 12/1998 | Sikorski et al. |
| 5,887,894 | A | 3/1999 | Castagner et al. |
| 5,899,494 | A | 5/1999 | Lane, Jr. |
| 5,899,495 | A | 5/1999 | Yamamoto et al. |
| 5,918,901 | A | 7/1999 | Johnson et al. |
| 5,931,497 | A | 8/1999 | Fischer |
| 5,979,937 | A * | 11/1999 | Yoshida et al. ............ 280/743.2 |
| 5,997,037 | A | 12/1999 | Hill et al. |
| 6,076,854 | A | 6/2000 | Schenck et al. |
| 6,123,358 | A | 9/2000 | Ryan et al. |
| 6,290,257 | B1 | 9/2001 | Bunce et al. |
| 6,390,501 | B1 | 5/2002 | Greib et al. |
| 6,454,300 | B1 | 9/2002 | Dunkle et al. |
| 6,502,858 | B2 | 1/2003 | Amamori |
| 6,511,094 | B2 | 1/2003 | Thomas et al. |
| 6,561,545 | B2 | 5/2003 | Greib et al. |
| 6,592,146 | B2 | 7/2003 | Pinsenschaum et al. |
| 6,616,184 | B2 | 9/2003 | Fischer |
| 6,659,499 | B2 | 12/2003 | Jenkins |
| 6,773,030 | B2 | 8/2004 | Fischer |
| 6,832,778 | B2 | 12/2004 | Pinsenschaum et al. |
| 6,932,384 | B2 | 8/2005 | Waid et al. |
| 6,932,385 | B2 | 8/2005 | Hawthorn et al. |
| 7,093,854 | B2 | 8/2006 | Fischer et al. |
| 7,134,691 | B2 | 11/2006 | Dunkle et al. |
| 7,162,320 | B2 | 1/2007 | Derson et al. |
| 7,195,281 | B2 | 3/2007 | Williams et al. |
| 7,249,783 | B2 | 7/2007 | Parkinson et al. |
| 7,261,320 | B2 | 8/2007 | Fredin et al. |
| 7,275,763 | B2 | 10/2007 | Thomas et al. |
| 7,374,205 | B2 | 5/2008 | Thomas |
| 7,377,548 | B2 | 5/2008 | Bauer et al. |
| 7,441,805 | B2 | 10/2008 | Jamison et al. |
| 7,445,237 | B2 | 11/2008 | Boyle, III et al. |
| 7,475,906 | B2 | 1/2009 | Goto et al. |
| 7,543,849 | B2 | 6/2009 | Bradburn |
| 7,556,290 | B2 | 7/2009 | Williams et al. |
| 7,568,729 | B2 | 8/2009 | Schnieder et al. |
| 7,597,356 | B2 | 10/2009 | Williams |
| 7,607,689 | B2 | 10/2009 | Kalczynski et al. |
| 7,631,892 | B2 | 12/2009 | Ishikawa et al. |
| 7,658,407 | B2 | 2/2010 | Ford et al. |
| 7,673,899 | B2 | 3/2010 | Abe |
| 7,722,080 | B2 | 5/2010 | Rose et al. |
| 7,726,685 | B2 | 6/2010 | Abe et al. |
| 7,748,738 | B2 | 7/2010 | Schneider |
| 7,793,978 | B2 | 9/2010 | Vegeant et al. |
| 2004/0017069 | A1 | 1/2004 | Fischer |
| 2005/0098990 | A1 | 5/2005 | Pinsenschaum et al. |
| 2006/0131847 | A1 | 6/2006 | Sata et al. |
| 2006/0249943 | A1 | 11/2006 | Bauer et al. |
| 2008/0007038 | A1 | 1/2008 | Fischer et al. |
| 2008/0042416 | A1 | 2/2008 | Razazi et al. |
| 2008/0073891 | A1 | 3/2008 | Rose et al. |
| 2008/0073892 | A1 | 3/2008 | Rose et al. |
| 2008/0073893 | A1 | 3/2008 | Schneider |
| 2008/0315567 | A1 | 12/2008 | Fischer et al. |
| 2009/0020991 | A1 | 1/2009 | Abe et al. |
| 2009/0026814 | A1 | 1/2009 | Kim et al. |
| 2009/0033081 | A1 | 2/2009 | Fischer et al. |
| 2009/0236839 | A1 | 9/2009 | McFadden et al. |
| 2010/0019476 | A1 | 1/2010 | Pausch |
| 2010/0140910 | A1 | 6/2010 | Fischer et al. |
| 2011/0031723 | A1 | 2/2011 | Fischer et al. |

FOREIGN PATENT DOCUMENTS

| | | |
|---|---|---|
| DE | 10 2009 011 830 | 12/2009 |
| EP | 1790538 | 5/2007 |
| WO | 2006073534 | 7/2006 |
| WO | 2008063103 | 5/2008 |

* cited by examiner

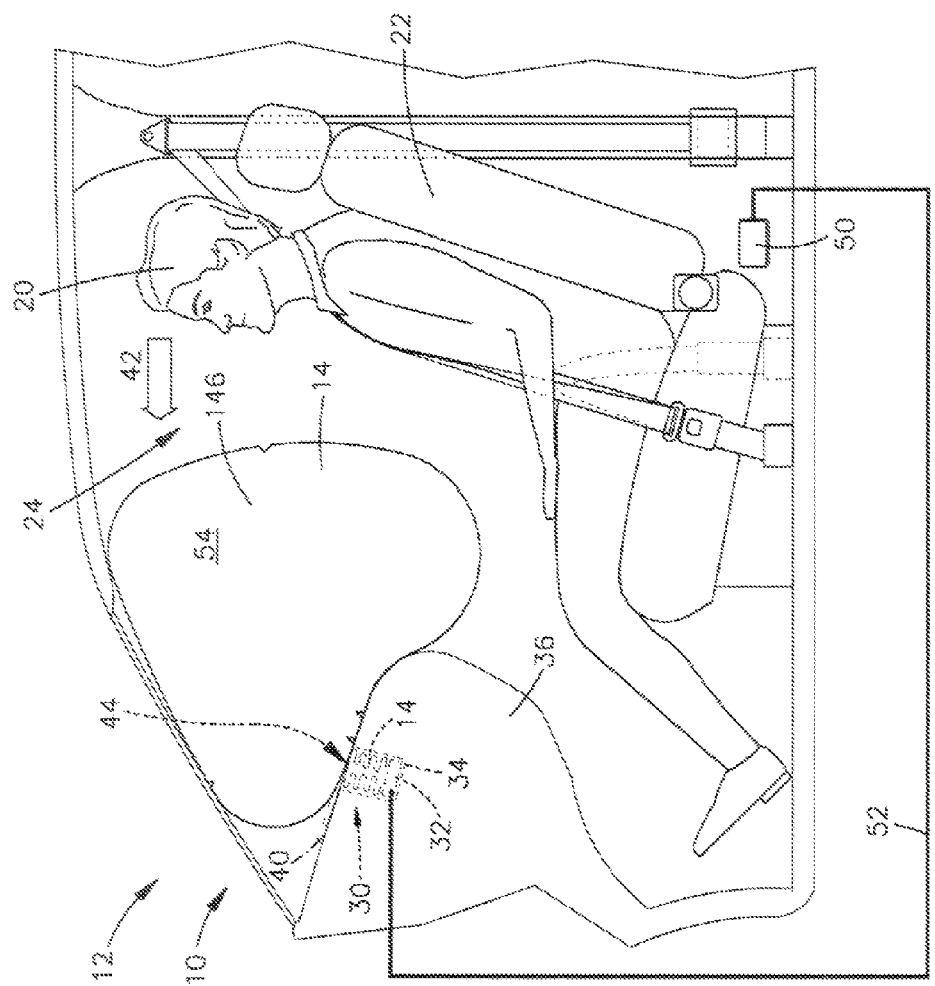

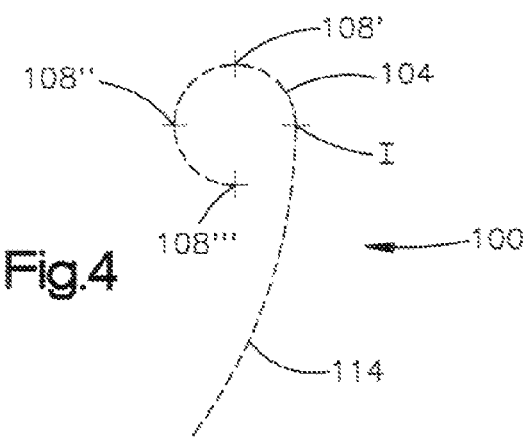
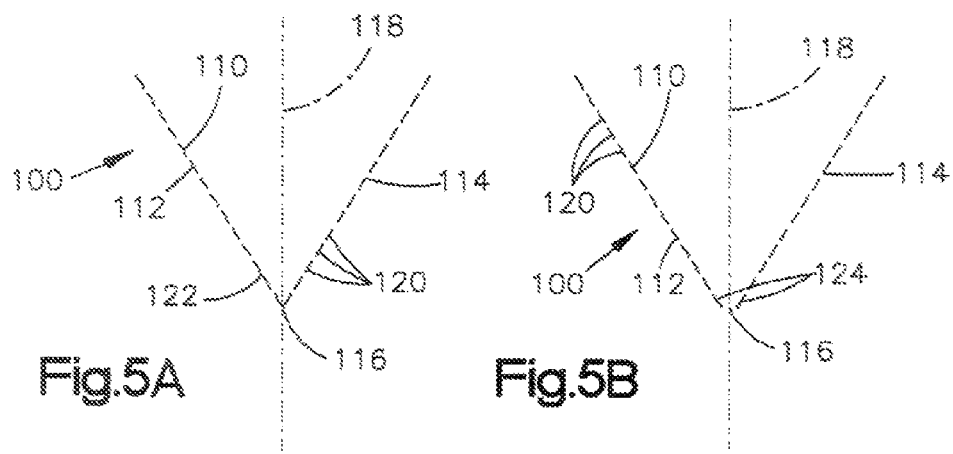
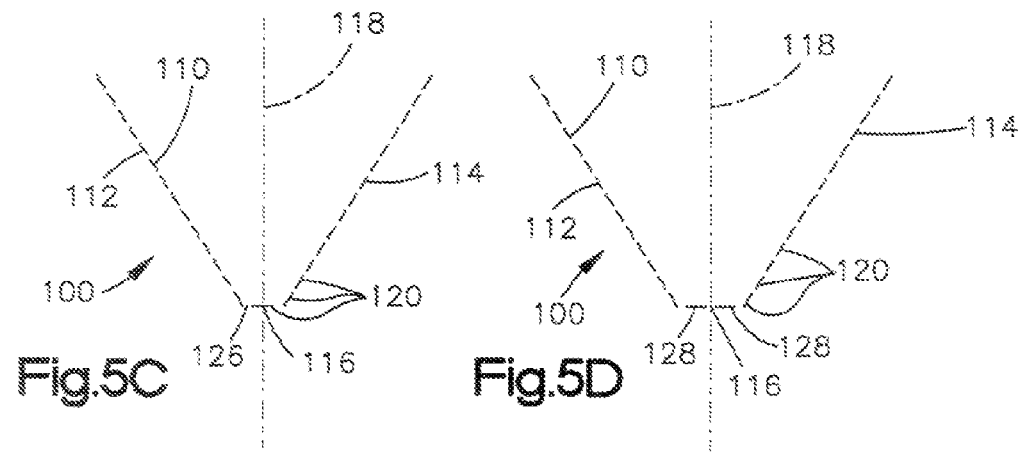

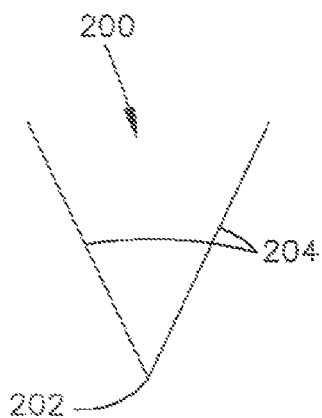 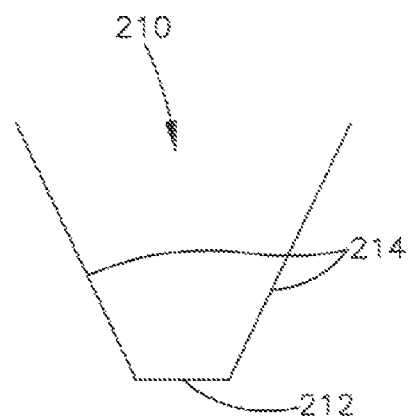
Fig.6A  Fig.6B
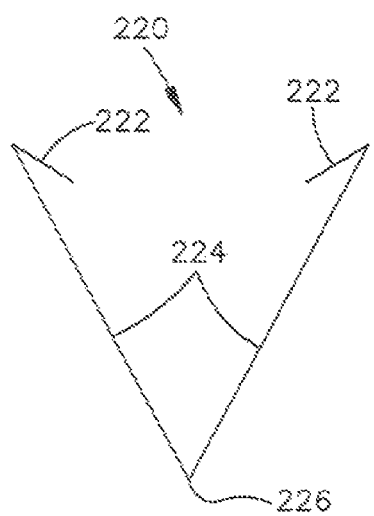 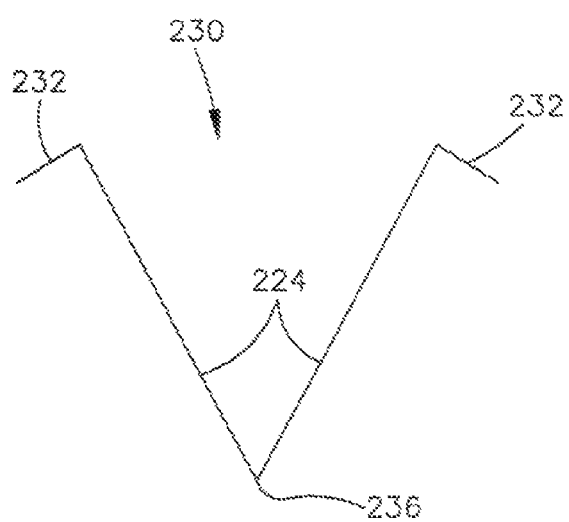
Fig.7A  Fig.7B

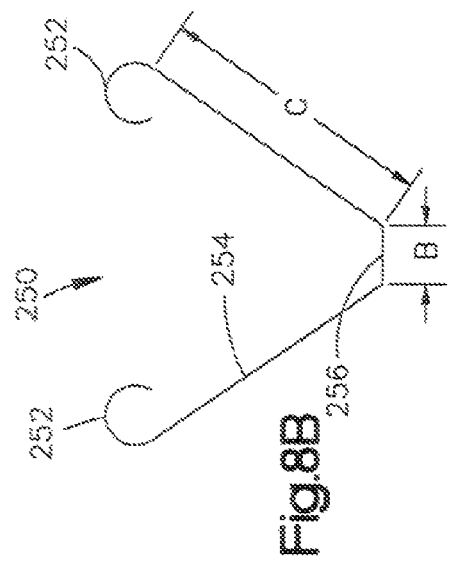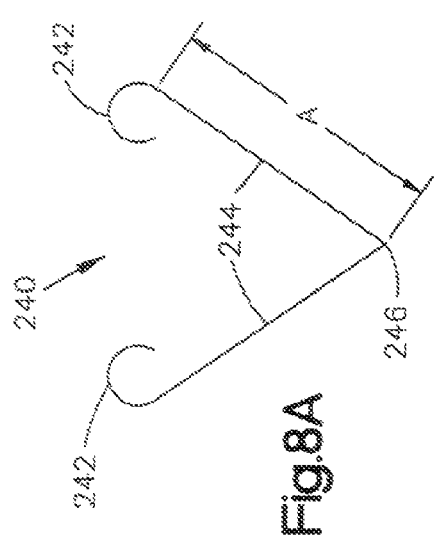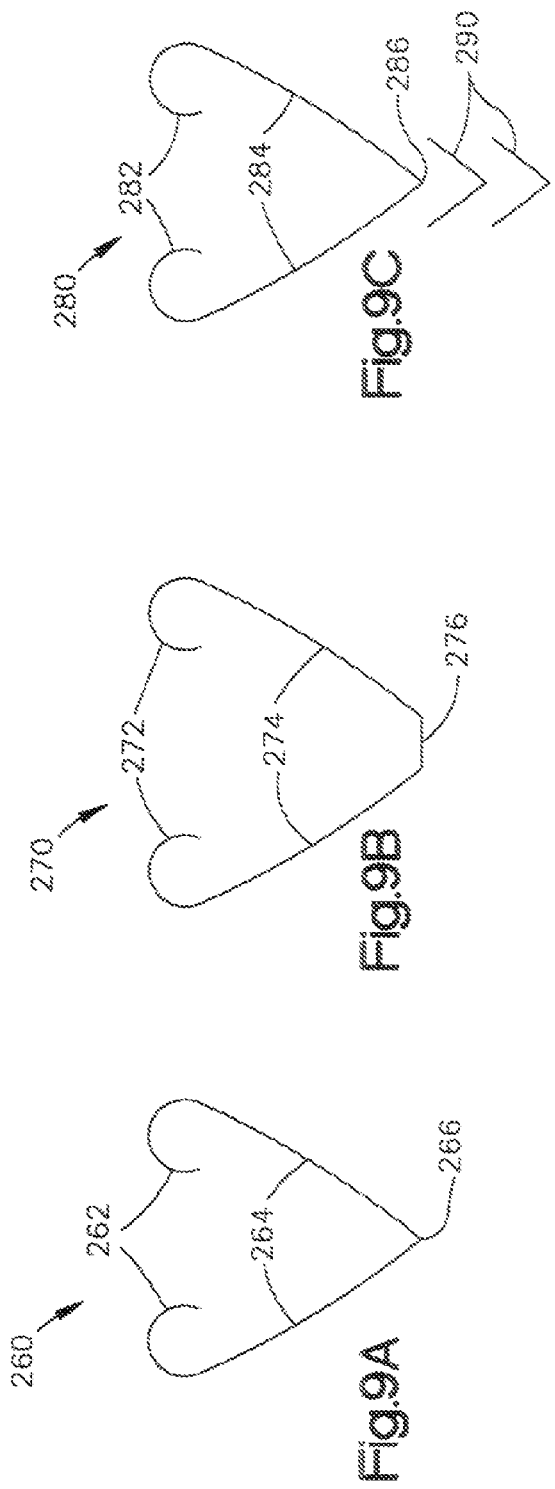

| SHAPE | STITCHES | RATIO (SHEAR/PEEL) |
|---|---|---|
| 300 | 53 | 6.96 |
| 302 | 53 | 5.34 |
| 304 | 53 | 4.60 |
| 306 | 98 | 7.37 |
| 308 | 83 | 7.64 |
| 310 | 72 | 6.82 |
| 312 | 84 | 7.99 |

Fig.10

TEAR STITCHING FOR INFLATABLE VEHICLE OCCUPANT PROTECTION DEVICES

RELATED APPLICATIONS

This application is a continuation in part of U.S. patent application Ser. No. 12/703,325, filed Feb. 10, 2010, now abandoned which is a continuation in part of U.S. patent application Ser. No. 12/077,826 filed on Mar. 21, 2008, which is a continuation in part of U.S. patent application Ser. No. 11/881,918 filed on Jul. 30, 2007, now U.S. Pat. No. 7,954,850 which is based on U.S. Provisional Application Ser. No. 60/936,710 filed on Jun. 21, 2007. This application is also a continuation in part of U.S. patent application Ser. No. 12/884,619, filed Sep. 17, 2010, which is a continuation in part of U.S. patent application Ser. No 12/077,826 filed on Mar. 21, 2008, which is a continuation in part of U.S. patent application Ser. No. 11/881,918 filed on Jul. 30, 2007, which is based on U.S. Provisional Application Ser. No. 60/936,710 filed on Jun. 21, 2007. All of these related applications are hereby incorporated by reference.

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to tear stitching for interconnecting portions of an inflatable vehicle occupant protection device. The tear stitching includes first and second end portions having curled configurations and a central portion extending between the end portions. The central portion includes leg portions that converge at an angle and intersect a break point. The tear stitching exhibits a comparatively high rupture strength in response to tension forces applied to the interconnected portions that act on the end portions of the tear stitching. The tear stitching exhibits a comparatively low rupture strength in response to tension forces applied to the interconnected portions that act on the break point of the tear stitching.

The present invention also relates to an apparatus for helping to protect an occupant of a vehicle. The apparatus includes an inflatable vehicle occupant protection device having a deflated condition and an inflated condition. Tear stitching interconnects portions of the protection device. The tear stitching includes a first end portion having a curled configuration, a second end portion having a curled configuration, and a central portion extending between the end portions. The central portion includes leg portions that converge at an angle and intersect a break point. The tear stitching exhibits a comparatively high rupture strength in response to tension forces applied to the interconnected portions that act on the end portions of the tear stitching. The tear stitching exhibits a comparatively low rupture strength in response to tension forces applied to the interconnected portions that act on the break point of the tear stitching.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic side view illustrating an apparatus for helping to protect an occupant of a vehicle;

FIG. 4 is a magnified view of a portion of the tear stitching of FIGS. 2 and 3;

FIGS. 5A-5D are illustrations of example configurations for certain portions of the tear stitching;

FIGS. 6A and 6B are illustrations comparing different configurations for certain portions of the tear stitching;

FIGS. 7A and 7B are illustrations comparing different configurations for certain portions of the tear stitching;

FIGS. 8A and 8B are illustrations comparing different configurations for certain Portions of the tear stitching;

FIGS. 9A-9C are illustrations comparing different configurations for certain portions of the tear stitching;

FIG. 10 is a chart illustrating certain characteristics for various tear stitching configurations;

DETAILED DESCRIPTION OF THE INVENTION

Figure 3:
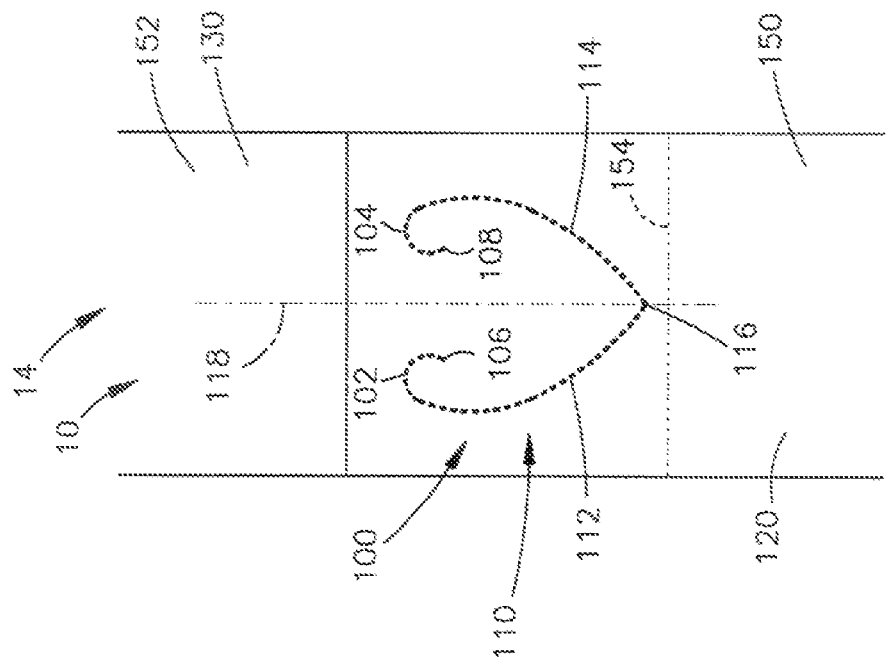
FIGS. 2 and 3 illustrate tear stitching used to interconnect portions of the apparatus of FIG. 1, according to the present invention.

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag for helping to protect an occupant 20 of a seat 22 on a passenger side 24 of the vehicle 12.

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored, condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material that define the inflatable volume 54 of the air bag. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated and deployed condition illustrated in solid lines in FIG. 1. The air bag 14, while inflated, helps protect the vehicle occupant 20 from impacts with parts of the vehicle 12, such as the instrument panel 36.

The air bag 14 may have one or more actuatable features for helping to control or tailor inflation of the air bag in response to vehicle conditions, occupant conditions, or both. These features may be actuatable actively, for example, in response to conditions determined via active sensors, or passively, for example, having a configuration responsive to physical conditions at the time of inflation.

According to the present invention, the apparatus includes rupturable tear stitching that can help facilitate these actuatable features. The rupturable tear stitching of the present invention promotes predictability, repeatability, and reliability in releasably securing interconnected portions of the protection device 14.

Figure 2:
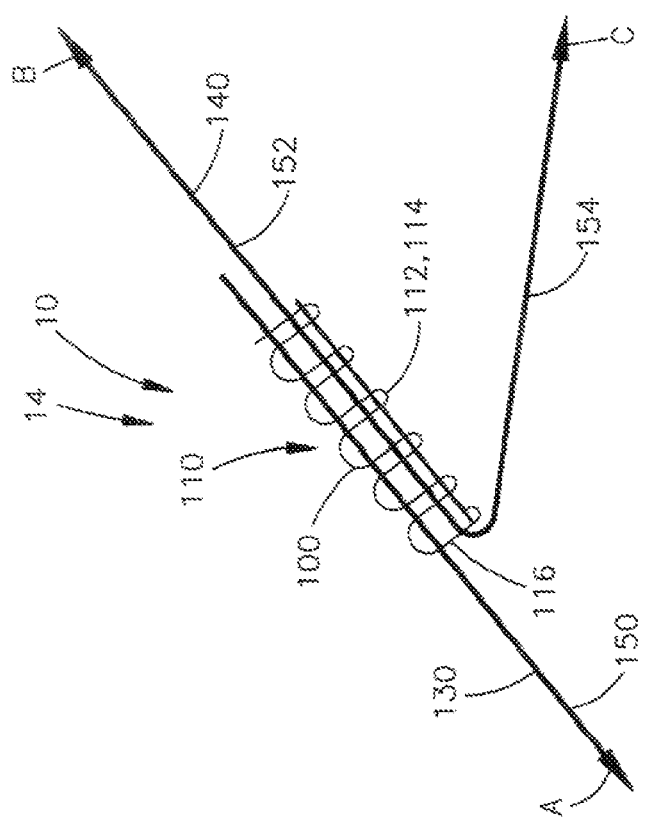

Referring to FIGS. 2 and 3, rupturable tear stitching 100 according to the present invention interconnects a first portion 130 of the protection device 14 to a second portion 140 of the protection device. The first and second portions 130 and 140 of the protection device 14 may be any portions of the device for which a releasable connection may be desired. For example, the first and second portions 130 and 140 may be tethers positioned within the inflatable volume 54 of the air bag 14. Alternatively, the first and second portions 130 and 140 may be portions of one or more panels that are used to construct the air bag 14. As a further alternative, the first and second portions 130 and 140 may be a combination of air bag panels and tethers.

The stitching 100 has a first end portion 102 and an opposite second end portion 104, and a central portion 110 that extends between the end portions. The central portion 110 includes first and second leg portions 112 and 114, respectively, that converge at an angle and intersect a break point 116. In the embodiment illustrated in FIGS. 2 and 3, the leg portions 112 and 114 of the central portion 110 are arranged in a generally V-shaped configuration and are curved convexly away from each other. The leg portions 112 and 114 thus face concavely toward each other.

In the embodiment illustrated in FIGS. 2 and 3, the first and second end portions 102 and 104 are configured to diverge from the path of the leg portions 112 and 114 in order to increase the rupture resistance of the end portions. More specifically, in the embodiment of FIGS. 2 and 3, the end portions 102 and 104 have generally rounded and curled configurations. In this embodiment, the end portions 102 and 104 are curled inward relative to the V-shape of the central portion 110 and into the space towards which the leg portions 112 and 114 face concavely. The end portions 102 and 104 thus curve or curl inward toward each other and downward toward the break point 116.

Respective terminal ends 106 and 108 of the end portions 102 and 104 are positioned inside the curvature of the end portions. By "inside the curvature" of the end portions, it is meant that the terminal ends 106 and 108 are positioned, with respect to central axis 118 of the stitching 100, within or between horizontal outer bounds of the end portions 102 and 104, respectively.

The position of the terminal ends 106 and 108 inside the curvature of the end portions 102 and 104 depends on the degree or extent to which the end portions are curved inward from the leg portions 112 and 114, as measured from their respective interfaces with the leg portions. For example, referring to FIG. 4, the end portion 104 may be curled inward at least ninety degrees) (90°) from its interface (indicated generally at "I") with the leg portion 114, thereby placing its terminal end at or beyond the location identified generally at 108' in FIG. 4. Alternatively, the end portion 104 may be curled inward at least one hundred eighty degrees (180°), thereby placing its terminal end at or beyond the location identified generally at 108" in FIG. 4. As a further alternative, the end portion 104 may be curled inward at least two hundred seventy degrees (270°), thereby placing its terminal end at or beyond the location identified generally at 108''' in FIG. 4. While FIG. 4 illustrates only the end portion 104 and its associated terminal end 108 and leg portion 114, those skilled in the art will appreciate that the end portion 102 and its associated terminal end 106 and leg portion 114 would possess identical characteristics.

Advantageously, the curled in configuration of the end portions 102 and 104 help improve or maintain the integrity of the shear strength of the tear stitching 100. The end portions 102 and 104 do this by "hiding" the terminal and 106 and 108 within the respective curls. Hiding the terminal ends 106 and 108 in this manner helps avoid tension forces applied to the first and second segments 150 and 152 from being focused on the terminal ends. This helps prevent premature rupture and thus helps promote the predictability, repeatability, and reliability of the connection between the portions 130 and 140 provided by the tear stitching 100.

Those skilled in the art will appreciate that hiding the end portions may be achieved in manners other than that illustrated with the curled inward configuration of FIGS. 2 and 3. For example, the curled configuration may have various shapes, such as a looser curve (e.g., increased radius) or a tighter curve (e.g., decreased radius). Additionally or alternatively, the end portions may have a curvature that varies in the degree or direction of curvature.

The break point 116 may have various configurations, examples of which are illustrated in FIGS. 5A-5D. FIGS. 5A-5D illustrate in detail the central portion 110 of the stitching 100 where the leg portions 112 and 114 converge at the break point 116. Referring to FIGS. 5A-5D, the stitching 100 is made up of a plurality of individual stitches 120 that form the leg portions 112 and 114 and the break point 116. The break point 116 is the lowermost portion of the stitching 100, as measured along the axis 118.

In the embodiment of FIG. 5A, the break point 116 is formed by a single stitch 122, which is the terminal stitch of the first leg portion 112. From the stitch 122 that forms the break point 116, the next stitch, which is the first stitch of the second leg portion 114, begins vertically above the break point, as measured along the axis 118.

In the embodiment of FIG. 5B, the break point 116 is formed by a pair of stitches 124. One of the stitches 124 is the terminal stitch of the first leg portion 112 of the central portion 110, and the other stitch 124 is the terminal stitch of the second leg portion 114 of the central portion 110. The stitches 124 forming the break point 116 in FIG. 5B terminate at or about the same vertical location as measured along the axis 118 and are spaced apart from each other evenly, or substantially evenly, from the axis 118.

In the embodiment of FIG. 5C, the break point 116 is formed by a single stitch 126. The stitch 126 extends transverse to both the first and second leg portions 112 and 114 and perpendicular to the axis 118. The stitch 126 extends across the axis 118 and interfaces with the terminal stitches of the first and second leg portions 112 and 114.

In the embodiment of FIG. 5D, the break point 116 is formed by multiple stitches 128, i.e., two stitches in this embodiment. The stitches 128 extend transverse to both the first and second leg portions 112 and 114 and perpendicular to the axis 118. One of the stitches 128 interfaces the terminal stitch of the first leg portion 112, and the other of the stitches 128 interfaces the terminal stitch of the second leg portion 114. Although two stitches 128 are illustrated in the embodiment of FIG. 5D, those skilled in the art will appreciate that the break point 116 may include a greater number of stitches, i.e., three or more stitches.

As shown in FIGS. 2 and 3, the tear stitching 100 divides the second portion 140 of the protection device 14 into two segments, which results in three interconnected segments of material. A first segment 150 is comprised of the first portion 130. Second and third segments 152 and 154, respectively, are comprised of portions of the second portion 140 on opposite sides of the tear stitching 100. Tension applied to the first segment 150 is indicated generally by the arrowhead labeled "A" in FIG. 2. Tension applied to the second segment 152 is indicated generally by the arrowhead labeled "B" in FIG. 2. Tension applied to the third segment 154 is indicated generally by the arrowhead labeled "C" in FIG. 2.

The tear stitching 100 is configured to rupture and release the connection between the first and second portions 130 and 140 in response to tension between the first and second portions. According to the present invention, the tear stitching 100 is adapted to release the connection between the first and second portions 130 and 140 depending on which of the first, second, and third segments 150, 152, and 154 are tensioned and the magnitude of the tension in those segments.

As shown in the example of FIGS. 2 and 3, tension between the first and second segments 150 and 152 acts on the tear stitching 100 in a manner different than tension between the first and third segments 150 and 154. Of course, tension between the second and third segments 152 and 154 does not act on the tear stitching 100 because those are segments of the same piece of material, i.e., the second portion 140 of the protection device 14. Those skilled in the art will appreciate that the relative directions A, B, and C in which the tension is applied to the segments 150, 152, and 154 may vary depending on the configuration of the protection device 14 and the identity of the portions 130 and 140 that are interconnected by the tear stitching 100. Since, however, the portions 130 and 140 are constructed of flexible materials, those skilled in the art will appreciate that the portions will self align under tension in the A-B or A-C directions so that those particular tension scenarios act on the tear stitching 100 in an identical or substantially identically manner.

More specifically, in the case of tension being applied between the first and second segments 150 and 152, the tension acts generally parallel to the overlying sections of the first and second portions 130 and 140 that are stitched together by the stitching 100. Force applied to the first and second segments 150 and 152 is thus essentially applied in shear across the tear stitching 100. The tear stitching 100 is constructed to help distribute the tension force over the tear stitching 100 and, in particular, over the curved leg portions 112 and 114 and the curled in end portions 102 and 104. As a result, in response to tension applied to the first and second segments 150 and 152, the tear stitching 100 will exhibit a comparatively high tear strength due to the distribution of tension over the curved segments. This is referred to herein as "shear strength."

In the case of tension being applied between the first and third segments 150 and 154, the tension acts at an angle or transverse to the overlying sections of the first and second portions 130 and 140 that are stitched together by the stitching 100. Tension between the first and third segments 150 and 154 thus produces a "peeling" force or action between the between the first and second portions 130 and 140 at the interface of the first and third segments 150 and 154. The tear stitching is configured so that the peeling action helps focus the tension forces on the break point 136 of the tear stitching 132. As a result, in response to tension applied to the first and third segments 150 and 154, the tear stitching 100 will exhibit a comparatively low tear strength due to the focusing of tension on the break point. This is referred to herein as "peel strength."

From the above, those skilled in the art will appreciate that the tear stitching 100 of the present invention can provide a comparatively high shear strength and a comparatively low peel strength. When tension is applied to the first and second segments 150 and 152, the tension forces are applied over a large portion or area of the tear stitching 100. Thus, the tension must overcome the combined strength of a plurality of individual stitches in order to overcome the shear strength of the tear stitching 100 and begin the cascading rupture of any remaining stitches that will result in the separation of the first and second portions 130 and 140 of the protection device 14.

Conversely, when tension is applied to the first and third segments 150 and 154 the tension forces result in the peeling action that focuses the tension forces on the break point 116. Thus, the tension must overcome the strength of the single or relatively few individual stitches that make up the break point 116 in order to overcome the shear strength of the tear stitching 100. Once the break point 116 ruptures, the rupture will cascade rapidly along the leg portions 112 and 114, thus resulting in the separation of the first and second portions 130 and 140 of the protection device 14.

According to the present invention, the shear strength and peel strength of the tear stitching 100 can be tailored to desired values through a variety of configurable characteristics. Through testing, it has been discovered that careful selection of particular combinations of these characteristics can yield tear stitching with a desired combination of shear and peel strengths. These characteristics include the shape of the tear stitching 100, the type of thread used to form the tear stitching, and the type of material used to construct the portions 130 and 140 interconnected by the stitching. To evaluate the effects that these characteristics have on the shear strength and peel strength of the stitching, the testing was focused on specific characteristics to determine the effects, if any, that those particular characteristics had on the shear strength, peel strength, or both peel and shear strengths.

Pointed Break Point vs. Flat Break Point

FIGS. 6A and 6B illustrate pointed and flat break points 202 and 212, respectively. Tests were performed to determine the effects of a pointed break point 202 (see FIG. 6A) versus a flattened break point 212 (see FIG. 6B) on the peel strength and shear strength of tear stitching 200 and 210, respectively. To focus the tests on the break point, the tests were performed on V-shaped stitching without any curled in or rounded end portions opposite the break points 202 and 212 and with straight leg portions 204 and 214, respectively. In performing these tests, the factors that were evaluated were the thread size of the stitching, the weight of the fabric used to construct the interconnected portions, whether the fabric was coated, and the configuration (pointed vs. flat) configuration of the break points 202 and 212. Evaluating factors other than the breakpoint configuration allowed for evaluating the magnitude of the effect the breakpoint has in comparison to the effects of the other factors.

To evaluate the effect that stitch thread size has on the peel strength of the tear stitching, Tex-90 thread was compared to Tex-105 thread. To evaluate the effect that the weight of the fabric used to construct the interconnected portions has on the peel strength, 585 dtex fabric was compared to 700 dtex fabric. To evaluate the effect that coating of the fabric used to construct the interconnected portions has on the peel strength, coated versus uncoated fabrics were compared. Finally, to evaluate the effect that the configurations of the break points 202 and 212 have on the shear and peel strength of the stitching, pointed versus a flattened breakpoints were compared.

In peel strength testing, it was determined that all four factors contribute significantly to the peel strength of the tear stitching. More specifically, the factors contributed to the peel strength in varying degrees, as listed below in the order of degree of contribution with the most significant contribution listed first:

1. Pointed Stitch versus Flat Stitch.
2. Thread Size.
3. Fabric Coating.
4. Fabric Weight.

In shear strength testing, it was determined that three of the four factors contribute significantly to the shear strength of the tear stitching. More specifically, three significant factors contributed to the shear strength in varying degrees, as listed below in the order of degree of contribution with the most significant contribution listed first:

1. Thread Size.
2. Fabric Weight.
3. Fabric Coating.

Of particular note in this set of tests was the fact that the stitch shape (pointed versus flat) of the break points 202 and 212 had very little effect on the shear strength of the tear stitching 200 and 210, respectively.

Through the testing set forth above, it was therefore determined that the stitch shape of the break point, being of particular significance in determining the peel strength and being of little significance in determining the shear strength, can be adjusted in order to tailor the peel strength while at the same time producing little effect on the shear strength. Since the other factors (thread size, fabric weight, and fabric coating) significantly affect both the shear strength and the peel strength, none can be used to tailor one of the shear and peel strengths without affecting the other of the two.

Inward vs. Outward End Portions

FIGS. 7A and 7B illustrate inward and outward end portions 222 and 232, respectively. Tests were performed to determine the effects of an inward end portion 222 (see FIG. 7) versus an outward end portion 232 on the shear strength of tear stitching 220 and 230, respectively. To focus the tests on the end portions, the tests were performed on V-shaped stitching with pointed break points 226 and 236 and straight leg portions 224 and 234, respectively. In performing these tests, the factors that were evaluated were the thread size of the stitching, the weight of the fabric used to construct the interconnected portions, the pull direction (up vs. down), and the configuration of the end portions 222 and 232. Evaluating factors other than the end portion configuration allowed for evaluating the magnitude of the effect the end portion configuration has in comparison to the effects of the other factors.

To evaluate the effect that stitch thread size has on the peel strength of the tear stitching, Tex-70 thread was compared to Tex-90 thread. To evaluate the effect that the weight of the fabric used to construct the interconnected portions has on the peel strength, 470 dtex uncoated fabric was compared to 700 dtex uncoated fabric. To evaluate the effect that the configurations of the end portions break points 222 and 232 have on the shear and peel strength of the stitching, the tear stitching 220 and 230 was configured identically in a 46 stitch pattern with the only difference being the inward/outward directions of the end portions.

In shear strength testing, it was determined that three of the four factors contribute significantly to the shear strength of the tear stitching. More specifically, three significant factors contributed to the shear strength in varying degrees, as listed below in the order of degree of contribution with the most significant contribution listed first:

1. Thread Size.
2. End Portion Direction.
3. Fabric Type.

The pull direction had a very little, insignificant effect on the shear strength of the stitching. Of particular note in this set of tests was the fact that the inward end portions 232 yielded a higher shear strength stitching 230 than the stitching 220 with the outward extending end portions 222. It was therefore determined that end portion direction could be used as an option in configuring or tailoring the shear strength of the tear stitching.

Additionally, multiple iterations of testing for each of the two stitch patterns proved that the inward end portion 222 produced a reduction in variability in shear strength over that of the outward end portion 232. The inward end portion 222 thus yielded more repeatable and reliable results. In observing the tests, it was noted that the outward end portions 232 began unraveling at their tips, whereas the inward end portions 222 would begin to rupture at the intersection with the leg portions 224. Unraveling cannot be controlled, whereas rupture can be controlled (e.g., via thread size). Therefore, the inward end portions 222 also provides the additional benefits in terms of controllability.

Number of Stitches

FIGS. 8A and 8B illustrate the number of stitches for pointed and flat break points 246 and 256, respectively. Tests were performed to determine the effects that the number of stitches has on the shear strength of tear stitching 240 (see FIG. 8A) and 250 (see FIG. 8B). The tests were performed on V-shaped stitching with both pointed and straight break points 246 and 256, respectively, and with straight leg portions 244 and 254, respectively. In all tests, the tear stitching 240 and 250 had identical curled intend portions 242 and 252, respectively.

In performing these tests, the factors that were evaluated were limited to the number of stitches in the tear stitching 240, 250. All individual stitches were 3 mm in length. Each end portion 242, 252 included seven stitches. Each flattened end portion 256 included two stitches, indicated generally at "B" in FIG. 8B. To vary the number of stitches in each pattern, the number of respective stitches in the leg portions 244 and 254, indicated generally at "A" and "C," respectively, were varied. Three patterns were evaluated: a 36 stitch pattern, a 44 stitch pattern, and a 54 stitch pattern.

The tests showed that the number of stitches contributed significantly to the shear strength of the tear stitching 240 and 250. Additionally, whether the tear stitching had the pointed break point 246 or the flattened break point 256 was again determined to have an insignificant effect on the shear strength of the tear stitching. It was therefore determined that number of stitches could be used as an option in configuring or tailoring the shear strength of the tear stitching.

Curled End Portions

FIGS. 9A-9C illustrate curled end portions 262, 272, and 282, respectively for different stitch configurations. Tests were performed to determine the effects of curled end portions 262 on the shear strength and peel strength of tear stitching 260 (see FIG. 9A), the effects of curled end portions 272 on the shear strength and peel strength of tear stitching 270 (see FIG. 9B), and the effects of curled end portions 282 on the shear strength and peel strength of tear stitching 280 (see FIG. 9C). The stitching in these tests included straight leg portions 264, 274, and 284. In performing these tests, the factors that were evaluated were the bobbin thread size, the stitch thread size, the configuration of the break points 266, 276, 286, and whether the stitching included a two lines of sacrificial stitching 290 adjacent the break points.

To evaluate the effect that the bobbin thread size has on the shear and peel strengths of the tear stitching, Tex-138 thread was compared to Tex-210 thread. To evaluate the effect that the stitch thread size has on the shear and peel strengths of the tear stitching, Tex-90 thread was compared to Tex-105 thread. To evaluate the effect that sacrificial stitching 290 has on the shear and peel strengths in comparison with the pointed and flattened break points 266 and 276, respectively, the sacrificial stitching was added to the stitching 280.

In shear strength testing, it was determined that stitch thread size contributed significantly to the shear strength of the stitching 260, 270, and 280. The bobbin thread size also contributed significantly to the shear strength of the stitching 260, 270, and 280, although not to the extent of the stitch thread size. The sacrificial stitching 290 had some contribution, although minimal, to the shear strength of the stitching 260, 270, and 280. This minimal contribution is further marginalized since the purpose of the sacrificial stitching 290 would be to absorb initial forces in the peel direction. Lastly, the pointed break point 266 versus the flat break point 276 had no appreciable effect on the shear strength of the stitching 260 and 270.

In peel strength testing, it was determined that stitch thread size contributed significantly to the peel strength of the stitching 260, 270, and 280. The inclusion of the pointed break point 266 versus the flattened break point 276 also contributed significantly to the peel strength of the stitching 260, 270, and 280 (the pointed break point significantly reduced the peel strength), although not to the extent of the stitch thread size. The sacrificial stitching 290 and bobbin thread size offered minimal contributions to the peel strength of the stitching 260, 270, and 280.

From the above, it was therefore appreciated that, for the stitching 260 and 270 illustrated in FIGS. 9A and 9B, the stitch thread size and bobbin thread size contributed significantly to the shear strength of the stitching. The pointed versus flat configurations of the break points 266 and 276 offered little impact on the shear strength of the stitching 260 and 270. Additionally, from the above, it was also appreciated that the stitch thread size contributed significantly to the peel strength of the stitching. The pointed versus flat configurations of the break points 266 and 276 also contributed significantly to the peel strength of the stitching 260 and 270. The size of the bobbin thread offered little impact on the peel strength of the stitching 260 and 270.

Therefore, with regard to the stitching 260 and 270 with the rounded end portions illustrated in FIGS. 9A and 9B, the bobbin thread size contributed significantly and uniquely to the shear strength of the stitching, and the inclusion of the pointed versus flattened breakpoints 266 and 276, respectively contributed significantly and uniquely to the peel strength of the stitching. Advantageously and according to the present invention, using a bobbin thread sized larger than the stitch thread helps ensure that the stitch thread will rupture first at the break point in a peeling scenario. This effectively isolates the bobbin thread from impacting the peel strength of the stitching, which allows the bobbin thread for being configured to provide a desired shear strength.

Finally, the rounded end portions 262 and 272 of the stitching 260 and 270, respectively, of FIGS. 9A and 9B, help remedy the scenario witnessed with the inward end portions 222 of FIG. 7A. The inward end portions 222 would begin to rupture at the intersection with the leg portions 224 because the sharp apex of the angle effectively focused the shear forces on those intersections, creating break points at those locations. The rounded end portions 262 and 272 of the embodiments of FIGS. 9A and 9B spread the shear forces, thus avoiding this shear force focusing and resulting rupture. As a result, the rounded end portions 262 and 272 provide the additional benefit of improved controllability of the shear strength of the stitching.

Leg Portions—Different V Shapes

Tests were performed to determine the effects of various shapes of the leg portions of the tear stitching. All other factors being equal, rounded end portions in combination with pointed break points yield the largest shear strength to peel strength ratio ("shear/peel ratio"). Knowing this, the configuration of the leg portions are the prime remaining factor that can be tailored to help provide a desired (e.g., maximized) shear-peel ratio. Various configurations of the leg portions were tested. To maximize the shear/peel ratio for each of the various shapes tested, the stitching included rounded end portions and a pointed break point.

Examples of the various stitch configurations that were tested are illustrated in FIG. 10. For each configuration, the bobbin thread was Tex-138, the stitching thread was Tex-105, and the stitch was 3 mm. The stitching interconnected identical portions of material. FIG. 10 illustrates the shape of the tested tear stitch configuration, the number of stitches used to form the stitch, and the resulting shear/peel ratio.

Stitch 300 is essentially the stitch configuration with straight leg portions that is illustrated in FIG. 8. The stitch 300 included 53 stitches and produced a shear/peel ratio of 6.96.

Stitch 302 extends or stretches the curled end portions downward and correspondingly shortens the length of the straight leg portions. The leg portions thus have an overall configuration in which the leg portions are curved convexly away from each other. The stitch 302 included 53 stitches and produced a reduced shear strength and an increased peel strength compared to the stitching 300, with a corresponding reduction in the shear/peel ratio to 5.34.

Stitch 304 further extends or stretches the curled end portions downward and correspondingly further shortens the length of the straight leg portions. The leg portions thus have an overall configuration in which the leg portions are curved convexly away from each other. The stitch 302 included 53 stitches and produced a further reduced shear strength and a further increased peel strength compared to the stitching 302, with a corresponding reduction in the shear/peel ratio to 4.60.

Stitch 306 includes a stitch similar or identical to the stitch 300, with an additional similar, scaled down stitch nested inside. The stitch 306 included 98 stitches and accordingly produced a sharply increased shear strength compared to the stitching 304. The peel strength, while increased due to the additional stitching, did not increase with the same proportion as the shear strength. The stitch 306 yielded an increase in the shear/peel ratio to 7.37.

Stitch 308 takes the nested stitch configuration and connects the two with a rounded end portion. The stitch 308 included 83 stitches and managed to produce only a slight decrease in shear strength compared to the stitching 306. The peel strength of the stitching 308 also decreased compared to the stitching 306, with a proportion higher than that of the shear strength. The stitch 308 yielded an increase in the shear/peel ratio to 7.64, despite the reduction in the number of stitches.

Stitch 310 is similar to the stitch 308, except that the stitch 310 has a more narrow overall width and an increased thickness. The stitch 310 included 72 stitches and produced a significant decrease in shear strength compared to the stitching 308. The peel strength of the stitching 310 also decreased compared to the stitching 308, but the decrease was not as significant. The stitch 310 yielded a decrease in the shear/peel ratio to 6.82.

Stitch 312 is similar to the stitch 310, except that the stitch 312 has a wider overall width and the same thickness. The stitch 312 included 84 stitches and produced a significant increase in shear strength compared to the stitching 310. The stitching 312, however, produced virtually no decrease in peel strength compared to the stitching 310. The stitch 312 yielded an increase in the shear/peel ratio to 7.99.

EXAMPLE IMPLEMENTATION

Figure 11:
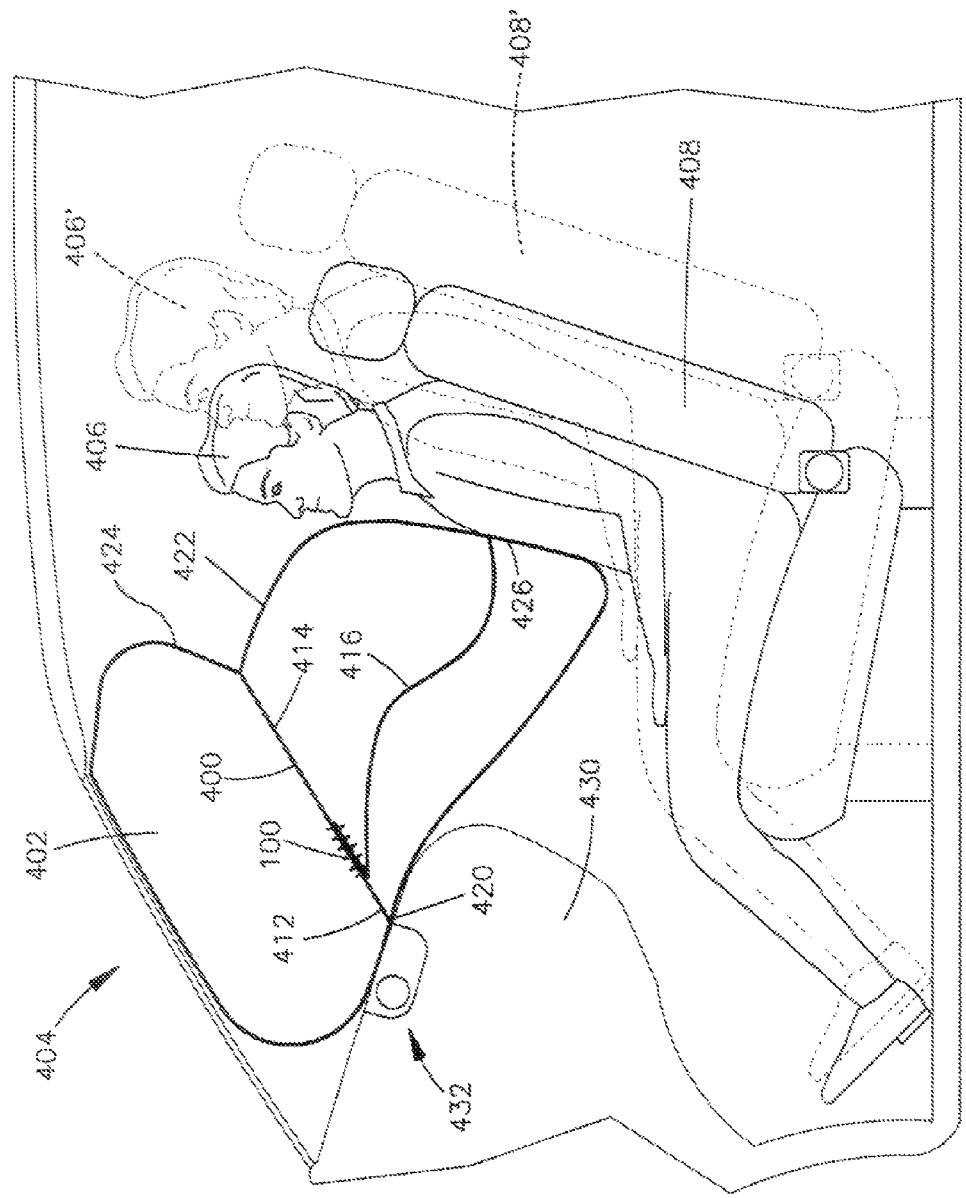
FIGS. 11 and 12 are schematic side views illustrating an example implementation of tear stitching according to the present invention.
Figure 12:
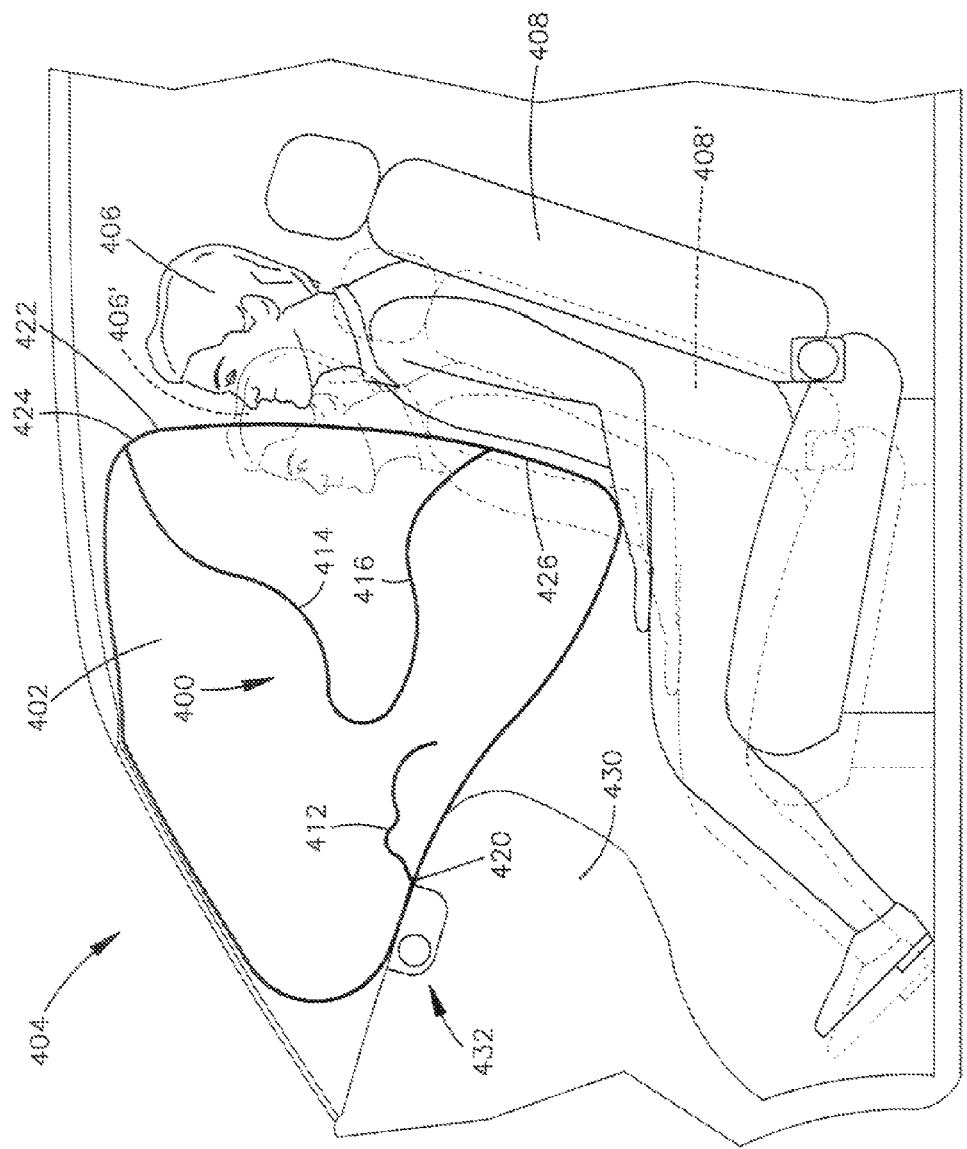

FIGS. 11 and 12 illustrate an example implementation of the tear stitching 100 of the present invention. In the example implementation of FIGS. 11 and 12, the stitching 100 is used to interconnect portions of an adaptive tether 400 for adapting the configuration of an air bag 402 depending on occupant conditions in a vehicle 404. The air bag 402 is a portion of an air bag module 432 mounted in an instrument panel 430 of the vehicle 404.

In FIGS. 11 and 12, the adaptive tether 400 is a three-leg tether that includes an anchor tether 412, a shaping tether 414, and a trigger tether 416. The anchor tether 412 corresponds to the first segment 150 of FIGS. 2 and 3. The shaping tether 414 corresponds to the second segment 152 of FIGS. 2 and 3. The trigger tether 416 corresponds to the third segment 154 of FIGS. 2 and 3.

The anchor tether 412 has a first end portion anchored to the vehicle 12 at location 420. The shaping tether 414 has a first end portion secured to an upper portion 424 of a front panel 422 of the air bag 404. The trigger tether 416 has a first end portion secured to a lower portion 426 of the front panel 422 of the air bag 404.

In an unactuated condition of the adaptive tether 400, the anchor tether 412, shaping tether 414, and trigger tether 416 are interconnected by the tear stitching 100. In this example embodiment, the tear stitching 100 is adapted to release the connection between the anchor tether 412 and the shaping and trigger tethers 414 and 416, depending on conditions in the vehicle 404 when the air bag 402 is deployed.

Tension applied by the shaping tether 414 applies a shear force on the tear stitching 100. Tension applied by the trigger tether 416 applies a peeling force on the tear stitching. The stitching 100 thus exhibits a high shear strength in response to tension applied by the shaping tether 414 and a comparatively low peel strength in response to tension applied by the trigger tether 416.

When an event occurs which inflation of the air bag 402 is desired, the adaptive tether 400 respond to vehicle conditions, occupant conditions, or both to help control inflation and deployment of the air bag. According to the embodiment of FIGS. 11 and 12, this control is implemented passively through the physical construction or configuration of the air bag 402 and adaptive tether 400. For example, the air bag 402 may be constructed to respond to the size or position of the vehicle occupant 406.

Referring to FIG. 11, the occupant 406 is positioned relatively close to the instrument panel 430 and therefore relatively close to the air bag module 432. This may be the case, for example, with a relatively small occupant, such as a child or small female occupant. For reference, a large occupant 406' such as an average size or large adult male is illustrated in dashed lines. Those skilled in the art will appreciate that the smaller occupant 406 may adjust the vehicle seat 408 to a position forward of the seat 408' of the larger occupant 406'.

As shown in FIG. 11, in the case of a forward positioned occupant 406, the mid/lower portion 426 of the front panel 422 of the air bag 402 engages the occupant during deployment. As shown, the forward positioned occupant 406 prevents the mid/lower portion 426 from deploying fully and thereby prevents the trigger tether 416 from becoming tensioned. As a result, the trigger tether 416 does not apply any significant tension or force on the tear stitching 100.

On the other hand, also shown in FIG. 11, in the case of a forward positioned occupant 406, the upper portion 424 of the front panel 422 of the air bag 402 does not engage the occupant during deployment. The forward positioned occupant 406 does not inhibit deployment of the upper portion 424 from deploying fully and, thus, the shaping tether 414 and anchor tether 412 become tensioned by the deploying front panel 422 of the air bag 402. As a result, the tension in the shaping tether 414 and anchor tether 412 is applied to the tear stitching 100, which connects the two tethers.

Since, as described above, the tear stitching 100 has a relatively high shear strength, in the case of the forward positioned occupant of FIG. 11, the tear stitching does not rupture in response to tension applied by the shaping tether 414. The shaping tether 414 helps maintain the shape of the air bag illustrated in FIG. 11. Those having skill in the art will appreciate that the shaping tether 414 helps maintain the upper portion 424 of the front panel 422 positioned away from the head of the forward positioned occupant 406.

Referring to FIG. 12, the occupant 406 is positioned away from the instrument panel 430 and therefore relatively far from to the air bag module 432. This may be the case, for example, with a relatively large occupant, such as an adult male occupant For reference, a small occupant 406' such as a child or small female occupant in a forward seat position is illustrated in dashed lines. Those skilled in the art will appreciate that the larger occupant 406 may adjust the vehicle seat 408 to a position rearward of the seat 408' of the smaller occupant 406'.

As shown in FIG. 12, in the case of a rearward positioned occupant 406, the occupant does not impede deployment of the mid/lower portion 426 of the front panel 422 of the air bag 402. The mid/lower portion 426 is free to deploy to a fully deployed position. As a result, the trigger tether 416 becomes tensioned under the force of the deploying front panel 422 and the trigger tether 416 applies a significant tension or force on the tear stitching 100.

Since, as described above, the tear stitching 100 has a relatively low peel strength, in the case of the rearward positioned occupant of FIG. 12, the tear stitching ruptures in response to tension applied by the trigger tether 416. This releases the connection between the anchor tether 412 and the shaping tether 414. As a result, the shaping tether 414 does not maintain the shape of the air bag 402 and the air bag is permitted to inflate to the fully deployed position illustrated in FIG. 12.

In view of the above, those skilled in the art will appreciate that the tear stitching 100 of the present invention facilitates the adaptive tether 400 shaping or restricting deployment of the air bag 402 in the event of a forward positioned occupant and permits full deployment in the event of a rearward positioned occupant. Those skilled in the art will also appreciate that the adaptive function of the tether 400 facilitated by the tear stitching 100 is not limited to forward/rearward occupant position per se. For example, the adaptive tether 400 could function similarly to shape or restrict deployment of the air bag 402 in the event of a child safety seat positioned on the vehicle seat 408. Also, the adaptive tether 400 could function similarly to shape or restrict deployment of the air bag 402 in the event of an extremely large occupant, without regard to the forward/rearward position of the seat 408. Further, the adaptive tether 400 could function similarly to shape or restrict deployment of the air bag 402 in the event of an occupant positioned away from a normal seating position, such as a leaned-over or leaned-forward position, without regard to the forward/rearward position of the seat 408 and without regard to the occupant's size.

From the above description of the invention, those skilled in the art will perceive improvements, changes and modifications. For example, while the example of FIGS. 11 and 12 illustrates an implementation in which tethers were interconnected by the tear stitching of the present invention, those skilled in the art will appreciate that the one or more of the tethers could be eliminated and the portion of the air bag to which those eliminated tethers were connected could be secured directly by the tear stitching. Additionally, while the example of FIGS. 11 and 12 illustrates an implementation in which the tear stitching is used to adaptively shape the air bag, those skilled in the art will appreciate an implementation in which the tear stitching is used to adaptively actuate an actuatable device, such as a vent. Other such improvements, changes and modifications within the skill of the art are intended to be covered by the appended claims.

Having thus described the invention, the following is claimed:

1. An apparatus for helping to protect an occupant of a vehicle, the apparatus comprising:
   an inflatable vehicle occupant protection device having a deflated condition and an inflated condition; and
   tear stitching for interconnecting portions of the protection device, the tear stitching comprising:
   a first end portion;
   a second end portion; and
   a central portion extending between the end portions, the central portion comprising leg portions that converge at an angle and intersect a break point;
   the first end portion extending from the first leg portion along a path that diverges from the path of the first leg portion;
   the second end portion extending from the second leg portion along a path that diverges from the path of the second leg portion;
   the protection device and the tear stitching being constructed and arranged such that initial tension can be applied to either the break point or the end portions in response to at least one of vehicle and occupant conditions at the time of inflation of the protection device;
   the tear stitching exhibiting a comparatively high rupture strength in response to the initial tension being applied to the end portions of the tear stitching;
   the tear stitching exhibiting a comparatively low rupture strength in response to the initial tension being applied to the break point of the tear stitching.

2. The tear stitching recited in claim 1, wherein the first and second end portions have curled configurations.

3. The tear stitching recited in claim 2, wherein the curled configurations of the first and second end portions are selected such that terminal ends of the first and second end portions are hidden from tension forces applied to the interconnected portions that act on the end portions of the tear stitching.

4. The tear stitching recited in claim 1, wherein the leg portions of the central portion are arranged in a V-shaped configuration.

5. The tear stitching recited in claim 1, wherein the leg portions are curved convexly away from each other.

6. The tear stitching recited in claim 4, wherein the first and second end portions are curled inward relative to the V-shape of the central portion and toward the break point.

7. The tear stitching recited in claim 6, wherein the end portions are curled inward greater than ninety degrees from their respective interfaces with the central portion.

8. The tear stitching recited in claim 1, wherein the break point comprises a single stitch, the leg portions extending away from each other and away from the break point.

9. The tear stitching recited in claim 1, wherein the portions of the protection device comprise first and second portions of the protection device that are arranged in an overlying manner, the tear stitching extending through and interconnecting the first and second portions, the first portion comprising a first segment of material, the second portion comprising a second segment of material that extends away from the end portions of the tear stitching in a first direction and a third segment of material that extends away from the break point of the tear stitching in a second direction;

the portions of the protection device and the tear stitching being constructed and arranged such that tension applied to the first and second segments creates a shear force that is focused on the end portions, the tear stitching therefore exhibiting a comparatively high rupture strength;

the portions of the protection device and the tear stitching being constructed and arranged such that tension applied to the first and third segments creates a peeling force that is focused on the break point, the tear stitching therefore exhibiting a comparatively low rupture strength.

10. An apparatus for helping to protect an occupant of a vehicle, the apparatus comprising:

an inflatable vehicle occupant protection device having a deflated condition and an inflated condition; and tear stitching for interconnecting portions of the protection device, the tear stitching comprising:

a first end portion;

a second end portion; and a central portion extending between the end portions, the central portion comprising leg portions that converge at an angle and intersect a break point;

the first end portion extending from the first leg portion along a curled path that diverges from the path of the first leg portion;

the second end portion extending from the second leg portion along a curled path that diverges from the path of the second leg portion;

the tear stitching exhibiting a comparatively high rupture strength in response to tension forces applied to the interconnected portions that act on the end portions of the tear stitching;

the tear stitching exhibiting a comparatively low rupture strength in response to tension forces applied to the interconnected portions that act on the break point of the tear stitching.

11. The tear stitching recited in claim 10, wherein the leg portions are curved convexly away from each other.

12. The tear stitching recited in claim 10, wherein the first and second end portions are curled inward relative to a V-shape of the central portion and toward the break point.

13. The tear stitching recited in claim 10, wherein the break point comprises a single stitch, the leg portions extending away from each other and away from the break point.

14. The tear stitching recited in claim 10, wherein the portions of the protection device comprise first and second portions of the protection device that are arranged in an overlying manner, the tear stitching extending through and interconnecting the first and second portions, the first portion comprising a first segment of material, the second portion comprising a second segment of material that extends away from the end portions of the tear stitching in a first direction and a third segment of material that extends away from the break point of the tear stitching in a second direction;

the portions of the protection device and the tear stitching being constructed and arranged such that tension applied to the first and second segments creates a shear force that is focused on the end portions, the tear stitching therefore exhibiting a comparatively high rupture strength;

the portions of the protection device and the tear stitching being constructed and arranged such that tension applied to the first and third segments creates a peeling force that is focused on the break point, the tear stitching therefore exhibiting a comparatively low rupture strength.

15. The tear stitching recited in claim 10, wherein the protection device and the tear stitching are constructed and arranged such that initial tension can be applied to either the break point or the end portions in response to at least one of vehicle and occupant conditions at the time of inflation of the protection device.

16. An apparatus for helping to protect an occupant of a vehicle, the apparatus comprising:

an inflatable vehicle occupant protection device having a deflated condition and an inflated condition; and tear stitching for interconnecting portions of the protection device, the tear stitching comprising:

a first end portion;

a second end portion; and a central portion extending between the end portions, the central portion comprising leg portions that converge at an angle and intersect a break point, the leg portions being curved convexly away from each other;

the first end portion extending from the first leg portion along a path that diverges from the path of the first leg portion;

the second end portion extending from the second leg portion along a path that diverges from the path of the second leg portion;

the tear stitching exhibiting a comparatively high rupture strength in response to tension forces applied to the interconnected portions that act on the end portions of the tear stitching;

the tear stitching exhibiting a comparatively low rupture strength in response to tension forces applied to the interconnected portions that act on the break point of the tear stitching.

17. The tear stitching recited in claim 16, wherein the first and second end portions have curled configurations.

18. The tear stitching recited in claim 16, wherein the first and second end portions are curled inward relative to a V-shape of the central portion and toward the break point.

19. The tear stitching recited in claim 16, wherein the break point comprises a single stitch, the leg portions extending away from each other and away from the break point.

20. The tear stitching recited in claim 16, wherein the portions of the protection device comprise first and second portions of the protection device that are arranged in an overlying manner, the tear stitching extending through and interconnecting the first and second portions, the first portion comprising a first segment of material, the second portion comprising a second segment of material that extends away from the end portions of the tear stitching in a first direction and a third segment of material that extends away from the break point of the tear stitching in a second direction;

the portions of the protection device and the tear stitching being constructed and arranged such that tension applied to the first and second segments creates a shear force that is focused on the end portions, the tear stitching therefore exhibiting a comparatively high rupture strength;

the portions of the protection device and the tear stitching being constructed and arranged such that tension applied to the first and third segments creates a peeling force that is focused on the break point, the tear stitching therefore exhibiting a comparatively low rupture strength.

21. The tear stitching recited in claim 16, wherein the protection device and the tear stitching are constructed and arranged such that initial tension can be applied to either the break point or the end portions in response to at least one of vehicle and occupant conditions at the time of inflation of the protection device.

* * * * *